US012676641B2

(12) United States Patent
Pehlke

(10) Patent No.: US 12,676,641 B2
(45) Date of Patent: Jul. 7, 2026

(54) BEAMFORMING IN RADIO FREQUENCY COMMUNICATION SYSTEMS USING FREQUENCY DIVISION DUPLEXING

(71) Applicant: Skyworks Solutions, Inc., Irvine, CA (US)

(72) Inventor: David Richard Pehlke, Westlake Village, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 836 days.

(21) Appl. No.: 17/929,131

(22) Filed: Sep. 1, 2022

(65) Prior Publication Data

US 2023/0105730 A1      Apr. 6, 2023

Related U.S. Application Data

(60) Provisional application No. 63/262,051, filed on Oct. 4, 2021.

(51) Int. Cl.
| | |
|---|---|
| H04B 1/44 | (2006.01) |
| H04B 7/06 | (2006.01) |
| H04B 7/08 | (2006.01) |
| H04L 5/14 | (2006.01) |

(52) U.S. Cl.
CPC ............. *H04B 1/44* (2013.01); *H04B 7/0617* (2013.01); *H04B 7/088* (2013.01); *H04L 5/14* (2013.01)

(58) Field of Classification Search
CPC ........ H04B 1/44; H04B 7/0617; H04B 7/088; H04L 5/14
See application file for complete search history.

(56) References Cited

U.S. PATENT DOCUMENTS

| | | | |
|---|---|---|---|
| 5,880,921 A | 3/1999 | Tham et al. | |
| 5,959,516 A | 9/1999 | Chang et al. | |
| 5,994,985 A | 11/1999 | Pehlke et al. | |
| 6,232,847 B1 | 5/2001 | Marcy et al. | |
| 7,636,554 B2 * | 12/2009 | Sugar ..................... | H04B 1/406 455/272 |
| 9,397,721 B2 | 7/2016 | Pehlke | |
| 9,496,913 B2 | 11/2016 | King et al. | |
| 9,572,052 B2 | 2/2017 | King et al. | |
| 9,621,327 B2 | 4/2017 | Chang et al. | |
| 9,748,992 B2 | 8/2017 | Pehlke | |

(Continued)

*Primary Examiner* — Michael J Moore, Jr.
(74) *Attorney, Agent, or Firm* — Knobbe, Martens, Olson & Bear, LLP

(57) ABSTRACT

Beamforming in radio frequency (RF) communication systems using frequency division duplexing (FDD) are provided. In certain embodiments, a front end system includes a first transmit path configured to process a first radio frequency transmit signal of a frequency band, the transmit path including a power amplifier and a transmit filter having a passband that passes an uplink frequency range of the frequency band, and a receive path configured to process a first radio frequency receive signal of the frequency band. The receive path includes a low noise amplifier, a switch, and a receive filter having a passband that passes a downlink frequency range of the frequency band, and the switch has a first state in which an input of the low noise amplifier is coupled to the receive filter and a second state in which an output of the power amplifier is coupled to the receive filter.

20 Claims, 12 Drawing Sheets

(56) References Cited

U.S. PATENT DOCUMENTS

| | | | |
|---|---|---|---|
| 9,768,941 B2 | 9/2017 | Pehlke | |
| 9,838,058 B2 | 12/2017 | Pehlke | |
| 9,859,850 B2 | 1/2018 | Pehlke | |
| 9,866,268 B2 | 1/2018 | King et al. | |
| 9,866,366 B2 | 1/2018 | Pehlke | |
| 9,991,918 B2 | 6/2018 | King et al. | |
| 10,014,889 B2 | 7/2018 | King et al. | |
| 10,050,529 B2 | 8/2018 | Pehlke et al. | |
| 10,069,615 B2 | 9/2018 | Chang et al. | |
| 10,075,199 B2 | 9/2018 | King et al. | |
| 10,103,772 B2 | 10/2018 | Pehlke et al. | |
| 10,135,469 B2 | 11/2018 | Chang et al. | |
| 10,145,878 B2 | 12/2018 | Brunel et al. | |
| 10,211,857 B2 | 2/2019 | King et al. | |
| 10,236,966 B2 | 3/2019 | Brunel et al. | |
| 10,256,851 B2 | 4/2019 | Pehlke et al. | |
| 10,340,961 B2 | 7/2019 | King et al. | |
| 10,374,555 B2 | 8/2019 | Pehlke et al. | |
| 10,374,650 B2 | 8/2019 | Pehlke et al. | |
| 10,432,274 B2 | 10/2019 | Pehlke | |
| 10,439,685 B2 | 10/2019 | Pehlke et al. | |
| 10,439,789 B2 | 10/2019 | Brunel et al. | |
| 10,447,317 B2 | 10/2019 | Chang et al. | |
| 10,447,442 B2 | 10/2019 | Pehlke et al. | |
| 10,454,506 B2 | 10/2019 | King et al. | |
| 10,560,139 B2 | 2/2020 | Brunel et al. | |
| 10,581,466 B2 | 3/2020 | Pehlke | |
| 10,587,291 B2 | 3/2020 | Pehlke et al. | |
| 10,615,835 B2 | 4/2020 | Pehlke et al. | |
| 10,644,861 B2 | 5/2020 | Pehlke | |
| 10,659,121 B2 | 5/2020 | Pehlke | |
| 10,670,644 B2 | 6/2020 | Brunel et al. | |
| 10,727,923 B2 | 7/2020 | Thyagarajan et al. | |
| 10,862,661 B2 | 12/2020 | Brunel et al. | |
| 10,880,764 B2 | 12/2020 | Ripley et al. | |
| 10,924,164 B2 | 2/2021 | Brunel et al. | |
| 10,944,523 B2 | 3/2021 | Pehlke et al. | |
| 10,951,173 B2 | 3/2021 | Pehlke et al. | |
| 10,985,796 B2 | 4/2021 | Pehlke | |
| 11,018,726 B2 | 5/2021 | Pehlke et al. | |
| 11,038,543 B2 | 6/2021 | Chang et al. | |
| 11,128,323 B2 | 9/2021 | Pehlke et al. | |
| 11,165,393 B2 | 11/2021 | Pehlke | |
| 11,165,477 B2 | 11/2021 | Brunel | |
| 11,223,324 B2 | 1/2022 | Balteanu et al. | |
| 11,309,946 B2 | 4/2022 | Pehlke | |
| 11,323,158 B2 | 5/2022 | Brunel et al. | |
| 11,336,325 B2 | 5/2022 | Pehlek | |
| 11,349,504 B2 | 5/2022 | Pehlke | |
| 11,368,179 B2 | 6/2022 | Pehlke | |
| 11,374,538 B2 | 6/2022 | Drogi et al. | |
| 11,387,797 B2 | 7/2022 | Drogi et al. | |
| 11,405,059 B2 | 8/2022 | Pehlke | |
| 2013/0188529 A1* | 7/2013 | Poulin | H04L 27/0008 370/278 |
| 2013/0250820 A1* | 9/2013 | Khlat | H04B 1/0057 370/280 |
| 2013/0254277 A1* | 9/2013 | Vasudevan | H04W 76/14 709/204 |
| 2015/0215937 A1* | 7/2015 | Khandani | H04L 1/00 370/277 |
| 2015/0229463 A1* | 8/2015 | Oh | H04B 1/48 370/278 |
| 2015/0305057 A1* | 10/2015 | Eriksson | H04J 4/00 370/280 |
| 2016/0127016 A1 | 5/2016 | Pehlke et al. | |
| 2016/0241026 A1 | 8/2016 | Pehlke | |
| 2016/0365908 A1 | 12/2016 | Chang et al. | |
| 2017/0230907 A1* | 8/2017 | Rose | H03F 3/24 |
| 2018/0092099 A1* | 3/2018 | Ishiguro | H04L 1/00 |
| 2018/0131500 A1 | 5/2018 | Pehlke | |
| 2018/0248676 A1* | 8/2018 | Raggio | H04B 7/15542 |
| 2018/0324967 A1* | 11/2018 | Mcgehee | H03F 3/19 |
| 2019/0123699 A1 | 4/2019 | Andrys et al. | |
| 2019/0245439 A1 | 8/2019 | Pehlke et al. | |
| 2020/0036406 A1 | 1/2020 | Pehlke et al. | |
| 2020/0076488 A1 | 3/2020 | Brunel | |
| 2020/0162114 A1 | 5/2020 | King et al. | |
| 2020/0228159 A1 | 7/2020 | Raghavan et al. | |
| 2020/0274219 A1 | 8/2020 | Pehlke | |
| 2020/0383075 A1* | 12/2020 | Ashworth | H04W 56/0005 |
| 2020/0403688 A1* | 12/2020 | Zhan | H04W 16/14 |
| 2020/0412403 A1* | 12/2020 | Pehlke | H04L 5/14 |
| 2021/0058124 A1 | 2/2021 | Pehlke | |
| 2021/0098897 A1 | 4/2021 | Pehlke et al. | |
| 2021/0099199 A1 | 4/2021 | Pehlke et al. | |
| 2021/0119592 A1 | 4/2021 | Drogi et al. | |
| 2021/0119761 A1 | 4/2021 | Brunel et al. | |
| 2021/0143852 A1 | 5/2021 | Pehlke | |
| 2021/0211145 A1 | 7/2021 | Loh et al. | |
| 2021/0211909 A1 | 7/2021 | Ripley et al. | |
| 2021/0218370 A1 | 7/2021 | Balteanu et al. | |
| 2021/0218422 A1 | 7/2021 | Pehlke | |
| 2021/0218434 A1 | 7/2021 | Pehlke | |
| 2021/0367684 A1* | 11/2021 | Bendinelli | H04B 17/104 |
| 2021/0409106 A1* | 12/2021 | Ashworth | H04L 5/143 |
| 2022/0014153 A1 | 1/2022 | Pehlke | |
| 2022/0014247 A1 | 1/2022 | Brunel | |
| 2022/0053435 A1* | 2/2022 | King | H04W 56/0005 |
| 2022/0069775 A1 | 3/2022 | Balteanu et al. | |
| 2022/0069846 A1 | 3/2022 | Loh et al. | |
| 2022/0069850 A1 | 3/2022 | Loh et al. | |
| 2022/0070868 A1* | 3/2022 | Ishiguro | H04W 52/52 |
| 2022/0085766 A1 | 3/2022 | Balteanu et al. | |
| 2022/0103192 A1 | 3/2022 | Pehlke | |
| 2022/0103193 A1 | 3/2022 | Pehlke | |
| 2022/0110064 A1 | 4/2022 | Pehlke | |
| 2022/0182084 A1 | 6/2022 | King et al. | |
| 2022/0182085 A1 | 6/2022 | King et al. | |
| 2022/0209834 A1 | 6/2022 | Kovacic | |
| 2022/0209836 A1 | 6/2022 | Kovacic | |
| 2022/0217028 A1 | 7/2022 | Pehlke | |
| 2022/0224373 A1 | 7/2022 | Pehlke | |
| 2022/0224382 A1 | 7/2022 | Brunel et al. | |
| 2022/0231710 A1* | 7/2022 | Pehlke | H04L 5/0048 |
| 2022/0247365 A1 | 8/2022 | Pehlke et al. | |
| 2022/0278708 A1 | 9/2022 | Pehlke | |
| 2022/0286093 A1 | 9/2022 | Drogi et al. | |
| 2022/0294400 A1 | 9/2022 | Cao et al. | |
| 2022/0294486 A1 | 9/2022 | Cao et al. | |
| 2022/0328964 A1* | 10/2022 | Hoirup | H03J 3/00 |
| 2023/0088332 A1* | 3/2023 | Biglarbegian | H04B 1/0078 455/552.1 |
| 2023/0105730 A1* | 4/2023 | Pehlke | H04B 1/44 370/280 |
| 2024/0106475 A1* | 3/2024 | Pehlke | H03F 3/245 |
| 2024/0146341 A1* | 5/2024 | Pehlke | H04B 1/0064 |
| 2024/0305317 A1* | 9/2024 | Leung | H04B 1/525 |
| 2025/0096837 A1* | 3/2025 | Pehlke | H04B 1/006 |
| 2025/0141618 A1* | 5/2025 | Raghavan | H04W 72/0453 |
| 2025/0300677 A1* | 9/2025 | Poulin | H04B 1/0064 |

* cited by examiner mXn DL MIMO nXm UL MIMO

BASE STATION 41a

43a1
43b1
43c1
43m1

MOBILE DEVICE 42

44a
44b
44c
44n

BASE STATION 41b

43a2
43b2
43c2
43m2

BEAMFORMING IN RADIO FREQUENCY COMMUNICATION SYSTEMS USING FREQUENCY DIVISION DUPLEXING

CROSS-REFERENCE TO RELATED APPLICATIONS

This application claims the benefit of priority under 35 U.S.C. § 119 of U.S. Provisional Patent Application No. 63/262,051, filed Oct. 4, 2021 and titled "BEAMFORMING IN RADIO FREQUENCY COMMUNICATION SYSTEMS USING FREQUENCY DIVISION DUPLEXING," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

Examples of RF communication systems include, but are not limited to, mobile phones, tablets, base stations, network access points, customer-premises equipment (CPE), laptops, and wearable electronics.

SUMMARY

In certain embodiments, the present disclosure relates to a front end system for a mobile phone. The front end system includes a first transmit path configured to process a first radio frequency transmit signal of a frequency band, the transmit path including a power amplifier and a transmit filter having a passband that passes an uplink frequency range of the frequency band. The front end system further includes a receive path configured to process a first radio frequency receive signal of the frequency band, the receive path including a low noise amplifier, a switch, and a receive filter having a passband that passes a downlink frequency range of the frequency band, the switch having a first state in which an input of the low noise amplifier is coupled to the receive filter and a second state in which an output of the power amplifier is coupled to the receive filter.

In some embodiments, the front end system is configured to simultaneously send a transmit beam on the uplink frequency range of the frequency band and to receive a receive beam on the downlink frequency range of the frequency band. According to a number of embodiments, the front end system is further configured to set the switch in the second state to aid in acquiring the receive beam.

In several embodiments, the switch is a crossbar switch operable to couple the input of the low noise amplifier to the transmit filter in the second state. According to a number of embodiments, the front end system is configured to send a transmit beam and to receive a receive beam, the front end system operable in a first mode in which the transmit beam and the receive beam are sent on different frequencies using frequency division duplexing, and a second mode in which the transmit beam and the receive beam are sent on a common frequency using time division duplexing. In accordance with various embodiments, the common frequency for time division duplexing in the second mode is configurable to be the uplink frequency range or the downlink frequency range.

In some embodiments, the front end system further includes a common antenna port connected to the transmit filter and the receive filter.

In various embodiments, the front end system further includes a first antenna port connected to the transmit filter and a second antenna port connected to the receive filter.

In several embodiments, the front end system further includes a transmit-path phase shifter along the transmit path and a receive-path phase shifter along the receive path.

In some embodiments, the frequency band is in frequency range two (FR2) of fifth generation (5G).

In certain embodiments, the present disclosure relates to a mobile device includes a transceiver configured to generate a plurality of radio frequency transmit signals including a first radio frequency transmit signal, and to receive a plurality of radio frequency receive signals including a first radio frequency receive signal. The mobile device further includes a front end system coupled to the transceiver and configured to provide beamforming in a frequency band using frequency division duplexing. The front end system includes a first signal conditioning circuit including a transmit path configured to process the first radio frequency transmit signal and a receive path configured to process the first radio frequency receive signal, the receive path including a low noise amplifier, a switch, and a receive filter having a passband that passes a downlink frequency range of the frequency band. The transmit path includes a power amplifier and a transmit filter having a passband that passes an uplink frequency range of the frequency band, and the switch has a first state in which an input of the low noise amplifier is coupled to the receive filter and a second state in which an output of the power amplifier is coupled to the receive filter.

In various embodiments, the transceiver is configured to control the front end system to simultaneously send a transmit beam on the uplink frequency range of the frequency band and to receive a receive beam on the downlink frequency range of the frequency band. According to a number of embodiments, the transceiver is configured to set the switch in the second state to aid in acquiring the receive beam. In accordance with several embodiments, in the second state the power amplifier and the receive filter operate to transmit the first radio frequency transmit signal over the downlink frequency range. According to some embodiments, the mobile device is in communication with a base station that calibrates the receive beam based on the transmission of the first radio frequency transmit signal over the downlink frequency range.

In various embodiments, the switch is a crossbar switch operable to couple the input of the low noise amplifier to the transmit filter in the second state. According to a number of embodiments, the transceiver is configured to control the front end system to send a transmit beam and to receive a receive beam, the front end system operable in a first mode in which the transmit beam and the receive beam are sent on different frequencies using frequency division duplexing, and a second mode in which the transmit beam and the receive beam are sent on a common frequency using time division duplexing. In accordance with several embodiments, the common frequency for time division duplexing in the second mode is configurable to be the uplink frequency range or the downlink frequency range. According to some embodiments, the transceiver is configured to control the front end system to emulate the mobile phone as a base station communicating using frequency division duplexing in the frequency band.

In several embodiments, the transmit filter and the receive filter are connected to a common antenna of an antenna array.

In various embodiments, the transmit filter is coupled to a first antenna of an antenna array and the receive filter is coupled to a second antenna of the antenna array.

In some embodiments, the first signal conditioning circuit further includes a transmit-path phase shifter along the transmit path and a receive-path phase shifter along the receive path.

In several embodiments, the frequency band is in frequency range two (FR2) of fifth generation (5G).

In various embodiments, the transceiver is operable to control a gain setting and a phase setting for each of the transmit path and the receive path to control beamforming.

In certain embodiments, a method of beamforming in a mobile phone is provided. The method includes forming a transmit beam, including processing a first radio frequency transmit signal of a frequency band using a transmit path through a first signal conditioning channel, the transmit path including a power amplifier and a transmit filter having a passband that passes an uplink frequency range of the frequency band. The method further includes forming a receive beam, including processing a first radio frequency receive signal of the frequency band using a receive path through the second signal conditioning channel, the receive path including a low noise amplifier, a switch, and a receive filter having a passband that passes a downlink frequency range of the frequency band. The method further includes setting the switch in a first state in which an input of the low noise amplifier is coupled to the receive filter, and setting the switch in a second state in which an output of the power amplifier is coupled to the receive filter.

DETAILED DESCRIPTION OF EMBODIMENTS

Figure 1:
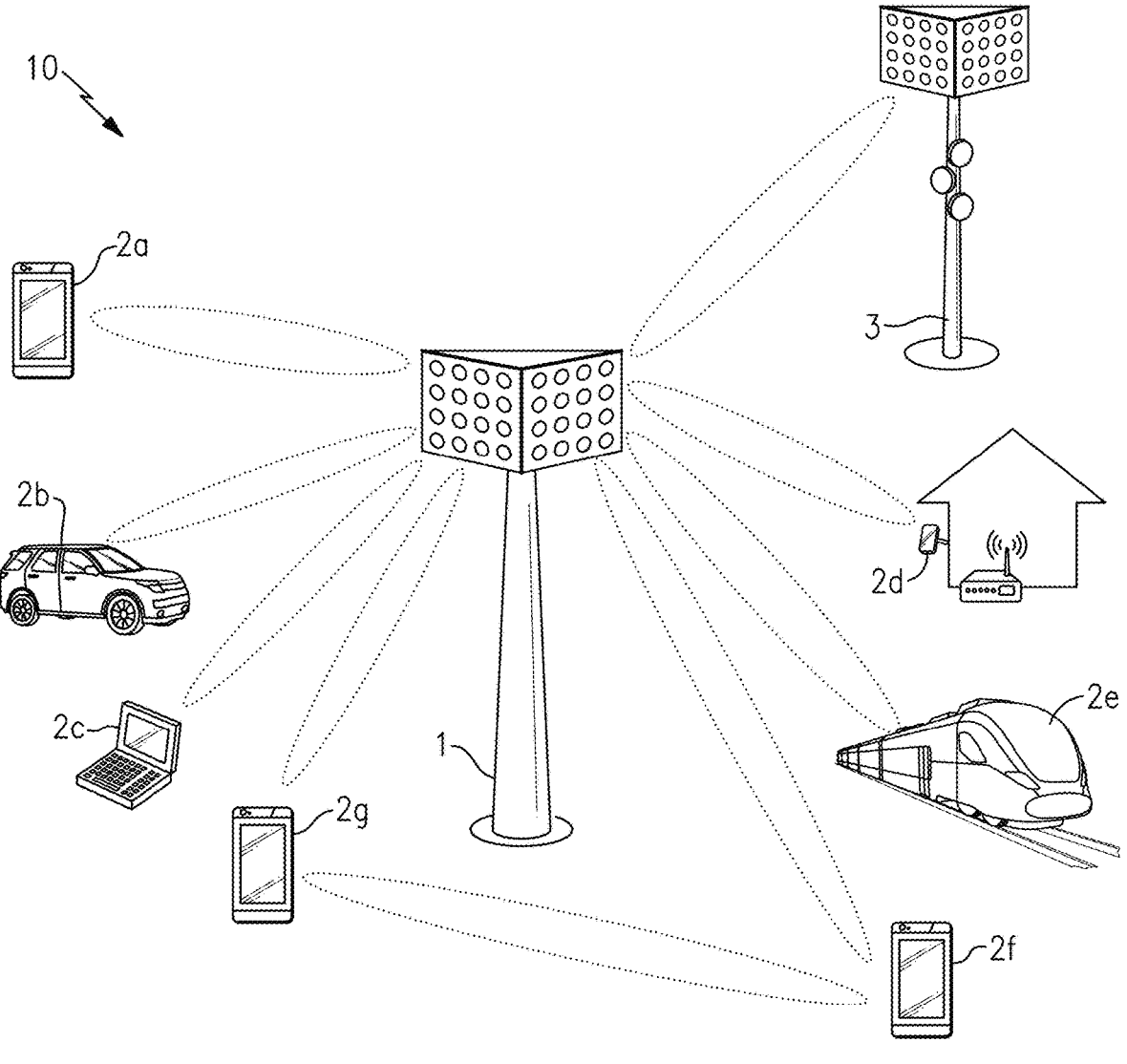
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

In certain implementations, the communication network 10 supports supplementary uplink (SUL) and/or supplementary downlink (SDL). For example, when channel conditions are good, the communication network 10 can direct a particular UE to transmit using an original uplink frequency, while when channel condition is poor (for instance, below a certain criteria) the communication network 10 can direct the UE to transmit using a supplementary uplink frequency that is lower than the original uplink frequency. Since cell coverage increases with lower frequency, communication range and/or signal-to-noise ratio (SNR) can be increased using SUL. Likewise, SDL can be used to transmit using an original downlink frequency when channel conditions are good, and to transmit using a supplementary downlink frequency when channel conditions are poor.

Figure 2A:
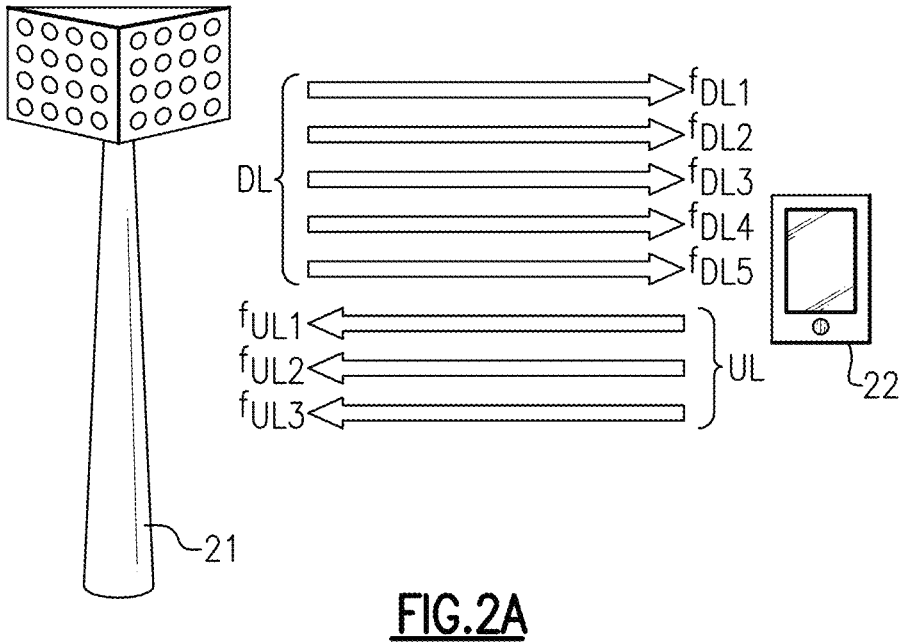
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
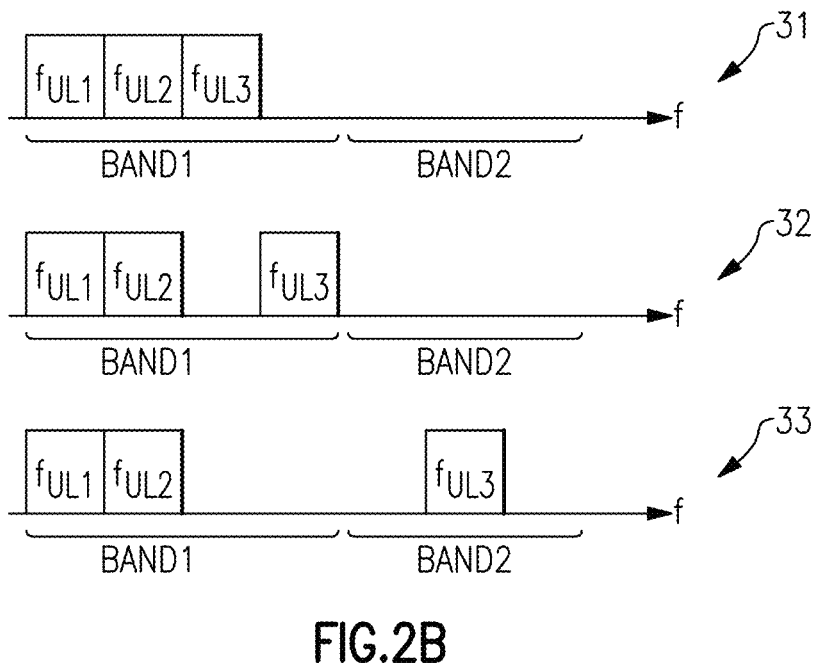
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
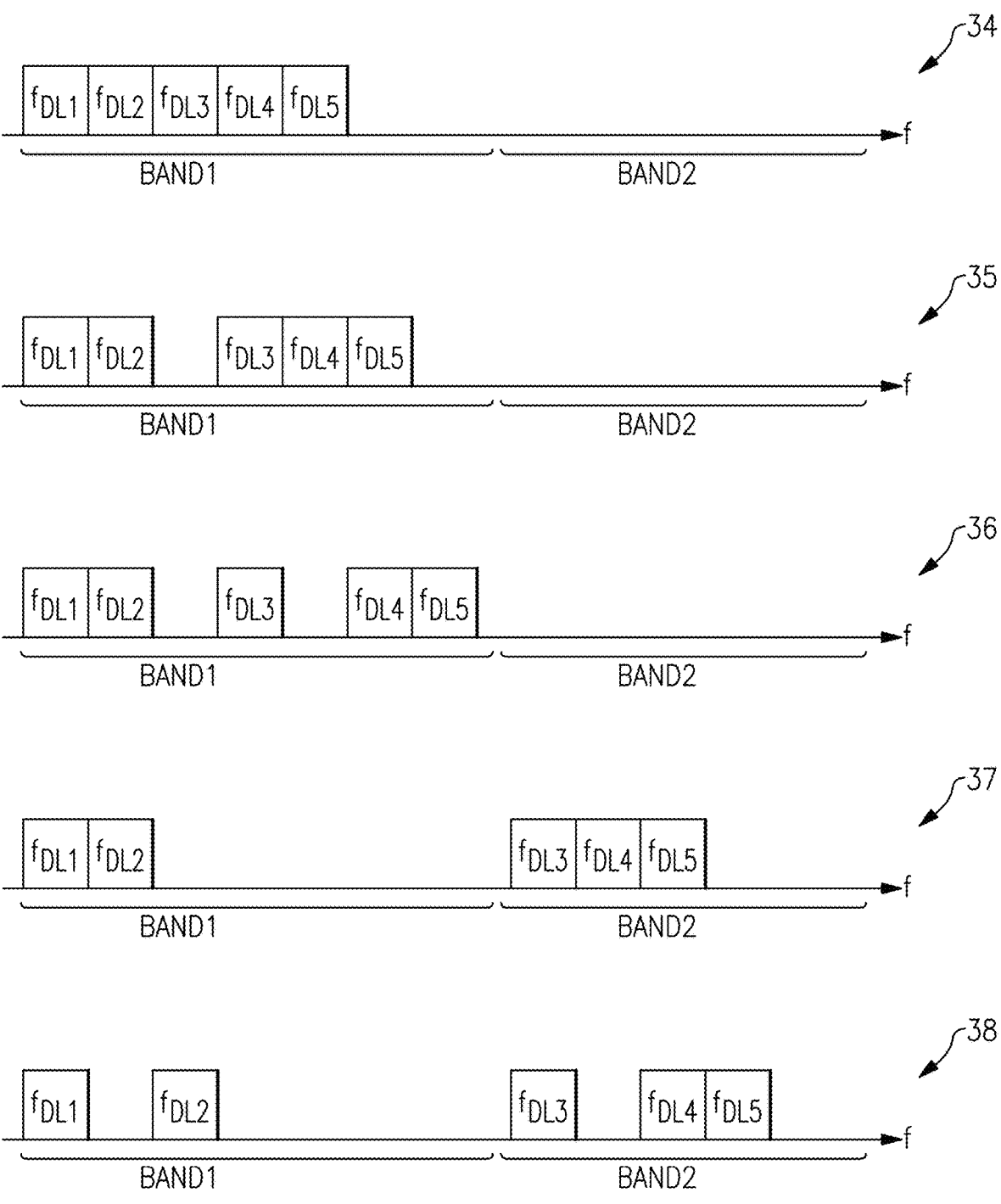
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
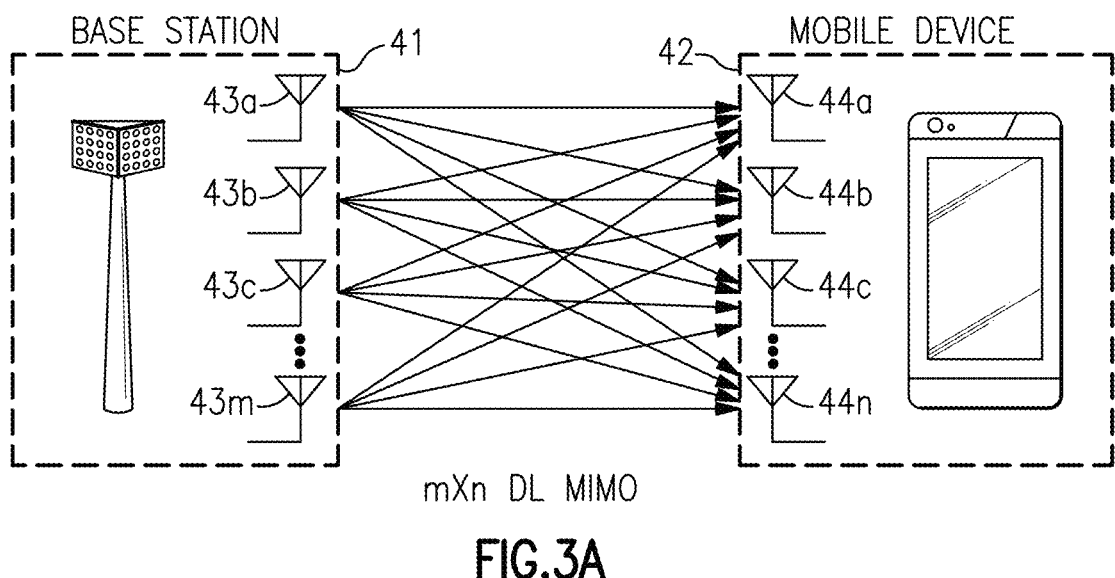
FIG. 3A is a schematic diagram of one example of a downlink channel using multi-input and multi-output (MIMO) communications.
Figure 3B:
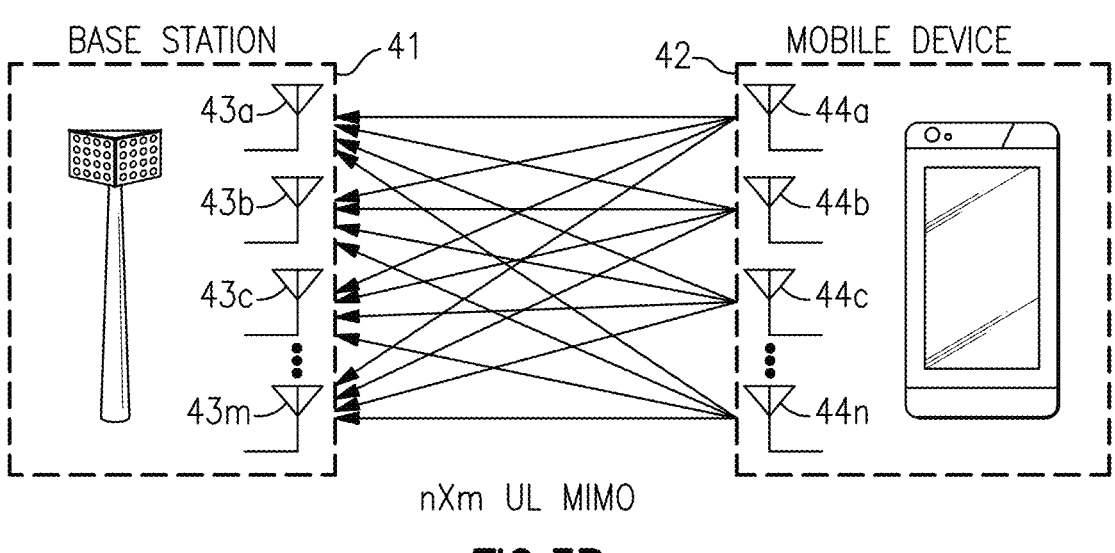
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
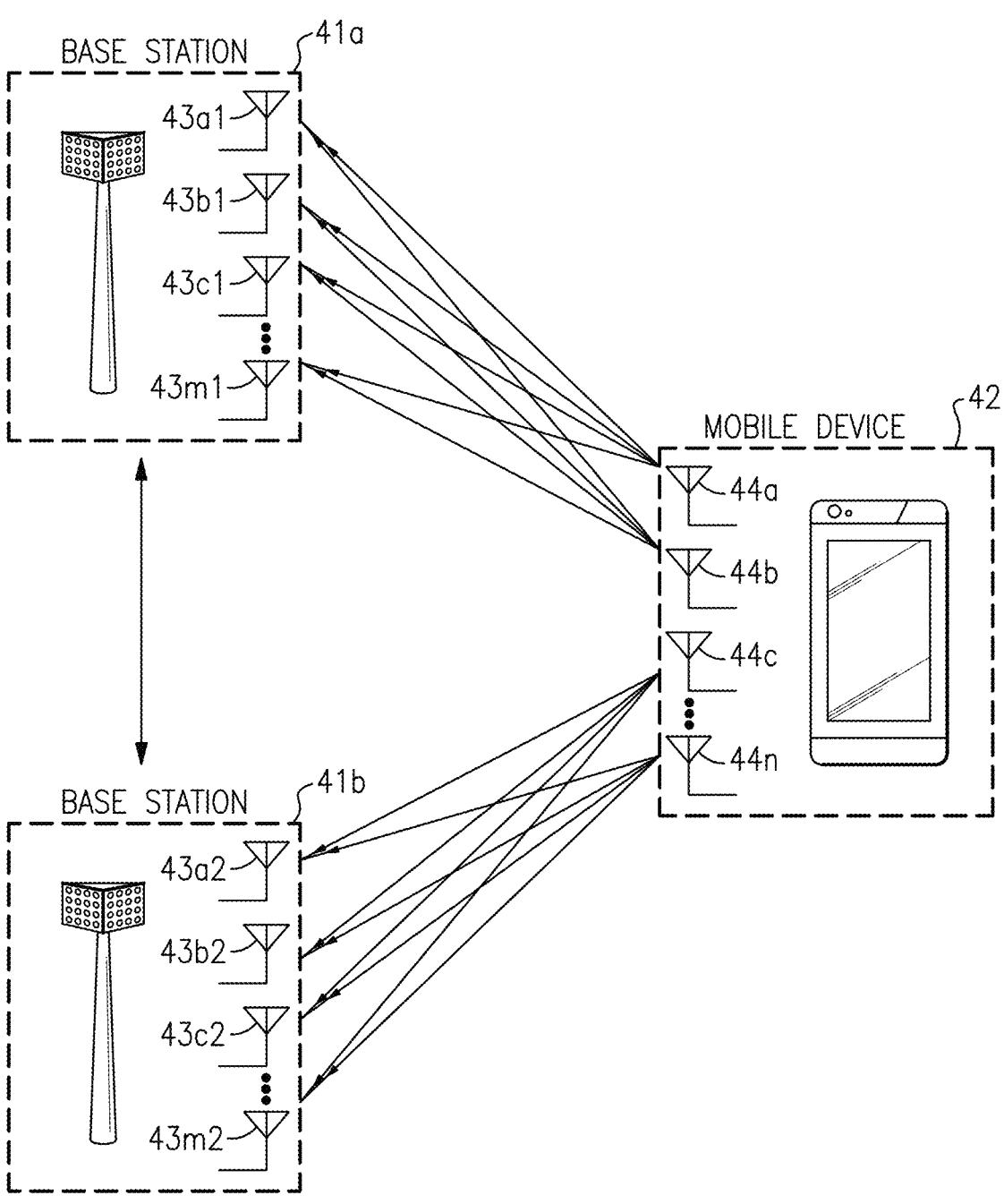
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

With the introduction of the 5G NR air interface standards, 3GPP has allowed for the simultaneous operation of 5G and 4G standards in order to facilitate the transition. This mode can be referred to as Non-Stand-Alone (NSA) operation or E-UTRAN New Radio-Dual Connectivity (EN-DC) and involves both 4G and 5G carriers being simultaneously transmitted from a user equipment (UE).

In certain EN-DC applications, dual connectivity NSA involves overlaying 5G systems onto an existing 4G core network. For dual connectivity in such applications, the control and synchronization between the base station and the UE can be performed by the 4G network while the 5G network is a complementary radio access network tethered to the 4G anchor. The 4G anchor can connect to the existing 4G network with the overlay of 5G data/control.

Figure 4:
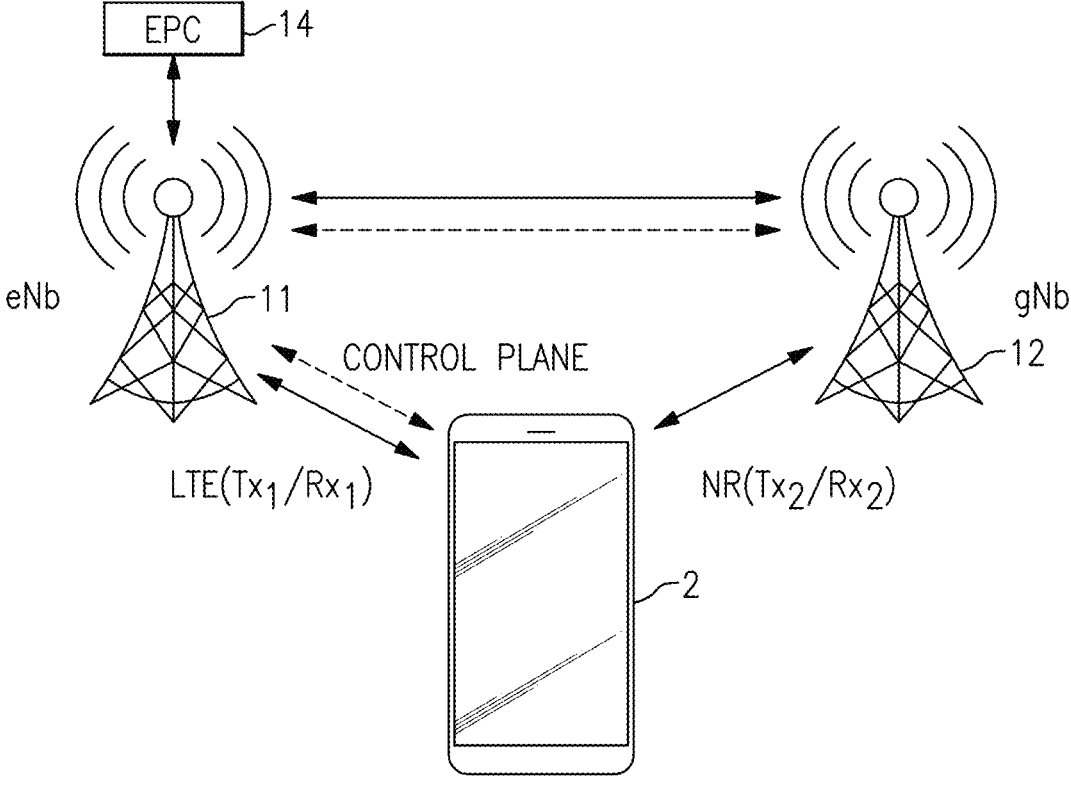
FIG. 4 is a schematic diagram of an example dual connectivity network topology.

FIG. 4 is a schematic diagram of an example dual connectivity network topology. This architecture can leverage LTE legacy coverage to ensure continuity of service delivery and the progressive rollout of 5G cells. A UE 2 can simultaneously transmit dual uplink LTE and NR carrier. The UE 2 can transmit an uplink LTE carrier Tx1 to the eNB 11 while transmitting an uplink NR carrier Tx2 to the gNB 12 to implement dual connectivity. Any suitable combination of uplink carriers Tx1, Tx2 and/or downlink carriers Rx1, Rx2 can be concurrently transmitted via wireless links in the example network topology of FIG. 1. The eNB 11 can provide a connection with a core network, such as an Evolved Packet Core (EPC) 14. The gNB 12 can communicate with the core network via the eNB 11. Control plane data can be wireless communicated between the UE 2 and eNB 11. The eNB 11 can also communicate control plane data with the gNB 12. Control plane data can propagate along the paths of the dashed lines in FIG. 4. The solid lines in FIG. 4 are for data plane paths.

In the example dual connectivity topology of FIG. 4, any suitable combinations of standardized bands and radio access technologies (e.g., FDD, TDD, SUL, SDL) can be wirelessly transmitted and received. This can present technical challenges related to having multiple separate radios and bands functioning in the UE 2. With a TDD LTE anchor point, network operation may be synchronous, in which case the operating modes can be constrained to Tx1/Tx2 and Rx1/Rx2, or asynchronous which can involve Tx1/Tx2, Tx1/Rx2, Rx1/Tx2, Rx1/Rx2. When the LTE anchor is a frequency division duplex (FDD) carrier, the TDD/FDD inter-band operation can involve simultaneous Tx1/Rx1/Tx2 and Tx1/Rx1/Rx2.

As discussed above, EN-DC can involve both 4G and 5G carriers being simultaneously transmitted from a UE. Transmitting both 4G and 5G carriers in a UE, such as a phone, typically involves two power amplifiers (PAs) being active at the same time. Traditionally, having two power amplifiers active simultaneously would involve the placement of one or more additional power amplifiers specifically suited for EN-DC operation. Additional board space and expense is incurred when designing to support such EN-DC/NSA operation.

Beamforming in RF Communication Systems Using FDD

A radio frequency (RF) communication system can include multiple antennas for supporting wireless communications. Additionally, the RF communication device can include a radio frequency front end (RFFE) for processing signals received from and transmitted by the antennas. The RFFE can include signal conditioning circuits for providing a number of functions, including, but not limited to, signal filtering, signal partitioning and combining, controlling component connectivity to the antennas, and/or signal amplification.

Figure 5A:
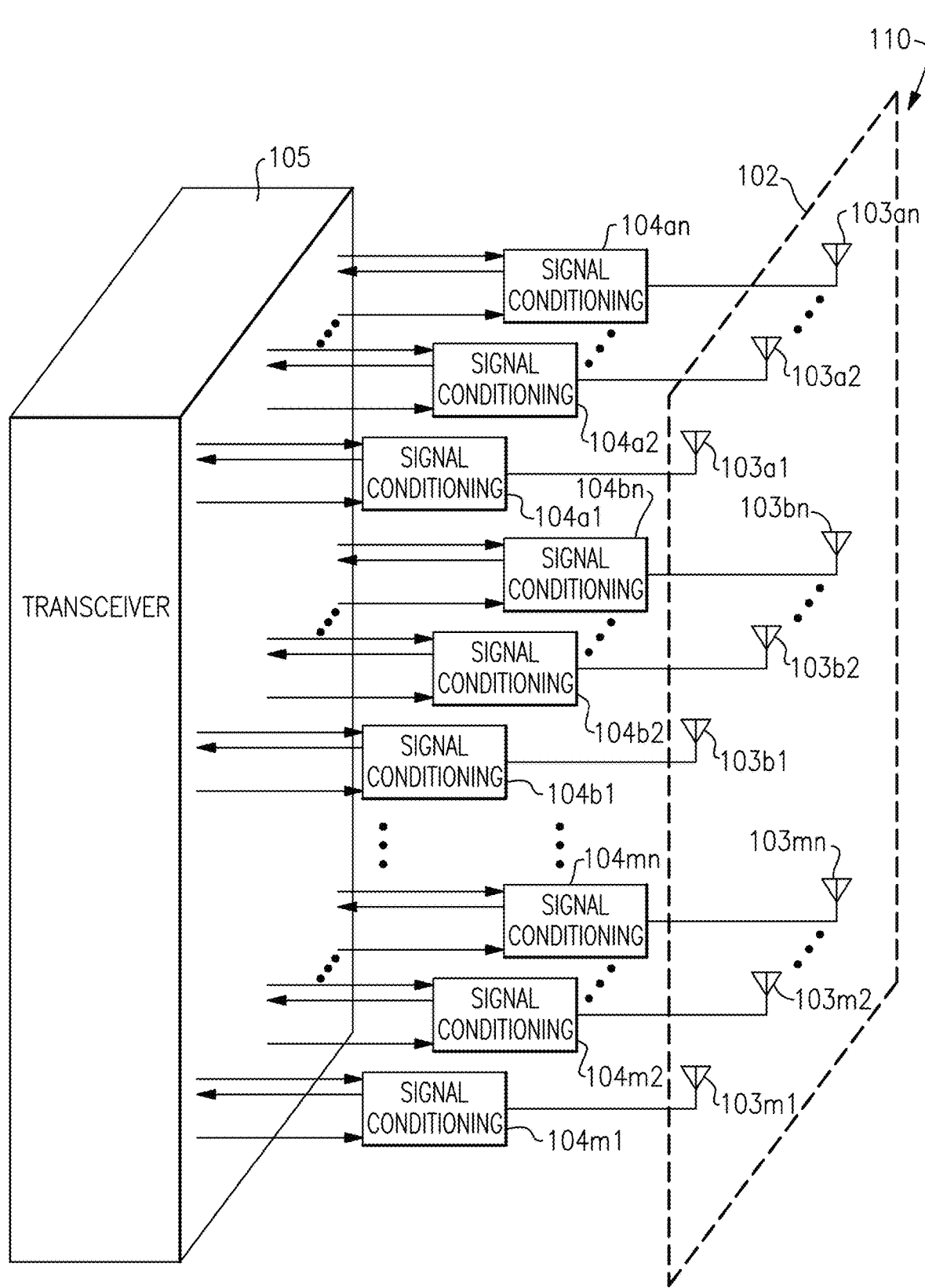
FIG. 5A is a schematic diagram of one embodiment of a radio frequency (RF) communication system with signal conditioning circuits to provide beamforming.

FIG. 5A is a schematic diagram of one embodiment of RF communication system 110 with signal conditioning circuits implemented to provide beamforming. The RF communication system 110 includes a transceiver 105, signal conditioning circuits 104a1, 104a2 . . . 104an, 104b1, 104b2 . . . 104bn, 104m1, 104m2 . . . 104mn, and an antenna array 102 that includes antenna elements 103a1, 103a2 . . . 103an, 103b1, 103b2 . . . 103bn, 103m1, 103m2 . . . 103mn.

Communications systems that communicate using millimeter wave carriers (for instance, 30 GHz to 300 GHz), upper centimeter wave carriers (for instance, 20 GHz to 30 GHz), and/or other frequency carriers can employ an antenna array to provide beam formation and directivity for transmission and/or reception of signals.

For example, in the illustrated embodiment, the RF communication system 110 includes an array 102 of m×n antenna elements, which are each controlled by a separate signal conditioning circuit, in this embodiment. As indicated by the ellipses, the RF communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 5A, the transceiver 105 generates control signals for the signal conditioning circuits. The control signals can be used for a variety of functions, such as controlling the gain and phase of transmitted and/or received signals to control beamforming.

Traditional beamforming systems use time division duplexing (TDD) in which transmission occurs on a frequency band during transmit time slots, and in which reception occurs on the same frequency band during receive time slots.

TDD multiplexing takes advantage of the reciprocal symmetry of the transmit channel and receive channel being equal to simplify the beam formation and tracking between the separate transmit and receive time slot durations as well as enabling the flexibility of adjusting the duty cycle between transmit time slots and receive time slots. The beam formation in TDD greatly simplifies the beam formation and acquisition because only a single consistent beam need be established the same for both transmit and receive. Moreover, less filtering is need for isolation between the victim receiver from the transmit carrier leakage and receive band noise impairments since transmission and reception is not concurrent.

In contrast to such systems, the teachings herein are directed toward frequency divisional duplexing (FDD) in which transmission and reception occur simultaneously but on different frequencies. In particular, the teachings herein are directed toward millimeter wave and upper centimeter wave beam formation, acquisition, and operation in FDD.

For example, the teachings herein can be used for beam-forming in FR2 for user equipment (UE) of a 5G network.

Beamforming in FDD can provide a number of advantages over TDD, including higher uplink data rate, concurrent downlink and uplink operation, and/or reduced latency. The teachings herein enable beamforming in FDD over FR2 range.

However, an FDD operating mode is often not as suitable for beamforming as TDD because with FDD the uplink channels and downlink channels are on different frequencies. For example, uplink is not reciprocal in frequency with downlink, and thus a base station has insufficient information from the mobile device about unequal RF environment and/or different channel model for uplink versus downlink due to the frequency difference.

The embodiments herein overcome such obstacles by enabling a mobile device to selectively transmit on the downlink frequency of the FDD band, which the base station (gNB) can make use of for downlink beam formation. These occasional uplink bursts within a downlink only frequency band enable improved channel modeling, beam formation for FDD, massive MIMO for FDD FR1, and/or effective beam directivity and management for FDD in FR2 and millimeter wave frequencies.

Figure 5B:
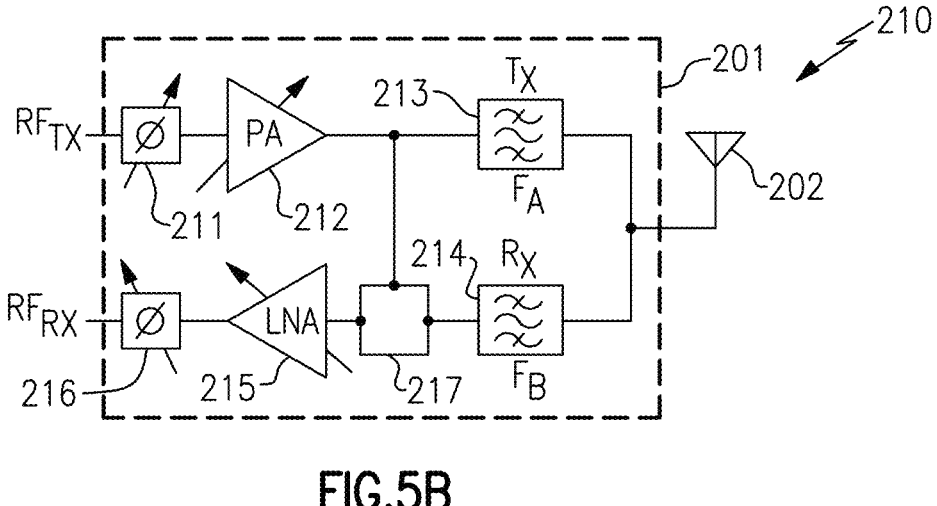
FIG. 5B is a schematic diagram of one embodiment of a beamforming signal channel using frequency division duplexing (FDD).

FIG. 5B is a schematic diagram of one embodiment of a beamforming signal channel 210 using FDD. The beamforming signal channel 210 includes a signal conditioning circuit 201 and an antenna 202.

In the illustrated embodiment, the signal conditioning circuit 201 includes a transmit-path phase shifter 211, a power amplifier 212, a transmit filter 213 (for an uplink frequency range $F_A$ of an FDD frequency band), a receive filter 214 (for a downlink frequency range $F_B$ of the FDD frequency band), a switch 217, a low noise amplifier 215, and a receive-path phase shifter 216.

The signal conditioning circuit 201 receives an RF transmit signal $RF_{TX}$, which is processed along an RF transmit path to the antenna 202. The RF transmit path includes the transmit-path phase shifter 211, the power amplifier 212, and the transmit filter 213. Additionally, an RF input signal from the antenna 202 is processed by an RF receive path to generate an RF receive signal $RF_{RX}$. The RF receive path includes the receive filter 214, the switch 217, the LNA 215, and the receive-path phase shifter 216.

With continuing reference to FIG. 5B, the signal conditioning circuit 201 provides gain and/or phase adjustments to the RF transmit signal $RF_{TX}$ and to the RF receive signal $RF_{RX}$ to provide beamforming.

For example, the transmit-path phase shifter 211 can provide a phase adjustment to the RF transmit signal $RF_{TX}$, while the power amplifier 212 (for example, an input stage of the power amplifier 212 and/or a variable gain amplifier in cascade with the power amplifier 212) can provide a gain adjustment to the RF transmit signal $RF_{TX}$. Likewise, the receive-path phase shifter 216 can provide a phase adjustment to the RF receive signal $RF_{RX}$, while the LNA 215 (for example, an output stage of the LNA 215 and/or a variable gain amplifier in cascade with the LNA 215) can provide a gain adjustment to the RF receive signal $RF_{RX}$.

Such gain and phase adjustments can be specific to a particular RF beamforming channel of a larger RF communication system (for example, the RF communication system of FIG. 5A).

In the illustrated embodiment, the power amplifier 212 can provide an amplified RF transmit signal to the antenna 202 by way of the transmit filter 213, which provides filtering over the frequency range $F_A$ (uplink frequency range) of the FDD band. For example, the transmit filter 213 passes frequency range $F_A$ while attenuating other frequencies such as frequency range $F_B$. However, the switch 217 is also included to allow the power amplifier 212 to transmit the amplified RF transmit to the antenna by way of the switch 217 and the receive filter 214, which provides filtering over the frequency range $F_B$ (downlink frequency range) of the FDD band. For example, the receive filter 214 passes frequency range $F_B$ while attenuating other frequencies such as frequency range $F_A$.

By implementing the signal conditioning channel 210 in this manner, the power amplifier 212 can send a conditioned transmit signal not only through the transmit filter 213 for transmit beam formation and acquisition, but also through the receive filter 214 for receive beam formation and acquisition. Such operating also aids in estimating characteristics of the signaling channel and/or to provide intermittent updates to beam settings during operation.

For example, such features aid in obtaining beam settings, phase angle, direction, intensity, and/or other beam parameters. Furthermore, such features aid in providing handshaking to make adjustments in order to iterate toward and converge to beam settings suitable for achieving a reliable beam for connecting with the gNodeB.

In the embodiment of FIG. 5B, the LNA 215 is dedicated to the RF receive path, while the power amplifier 212 can be flexibly deployed to either the RF transmit path or the RF receive path.

Figure 5C:
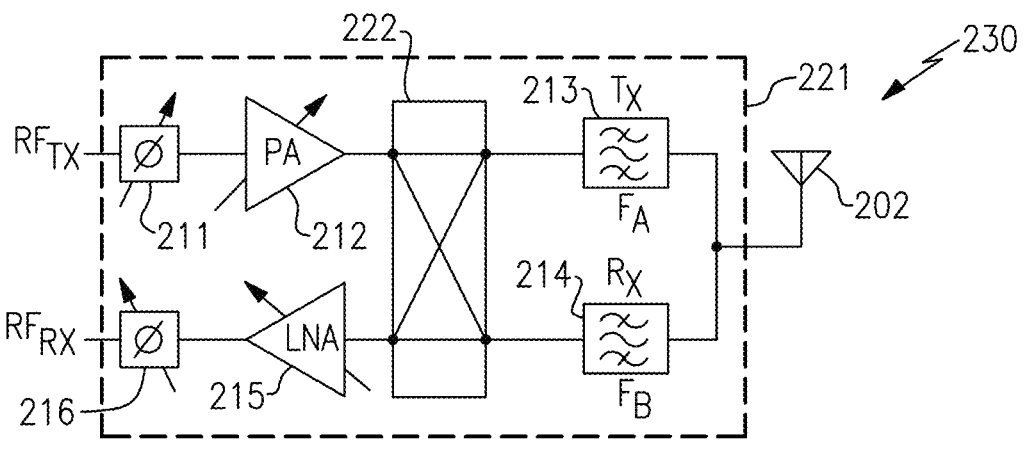
FIG. 5C is a schematic diagram of another embodiment of a beamforming signal channel using FDD.

FIG. 5C is a schematic diagram of another embodiment of a beamforming signal channel 230 using FDD. The beamforming signal channel 230 includes a signal conditioning circuit 221 and an antenna 202.

The signal conditioning circuit 221 of FIG. 5C is similar to the signal conditioning circuit 201 of FIG. 5B, except that the signal conditioning circuit 221 of FIG. 5C omits the switch 217 of FIG. 5B in favor of including a crossbar switch 222.

By including the crossbar switch 222, both the power amplifier 212 and the LNA 215 can be flexibly arranged to connect to either the RF transmit path or the RF receive path. This enables a device to operate either as user equipment (UE) by transmitting the RF transmit signal $RF_{TX}$ through the transmit filter 213 and by receiving the RF receive signal $RF_{RX}$ through the receive filter 214, or as a gNodeB/base station, small cell/access point, and/or repeater by transmitting the RF transmit signal $RF_{TX}$ through the receive filter 214 and by receiving the RF receive signal $RF_{RX}$ through the transmit filter 213.

Thus, the embodiment of FIG. 5C provides flexibility in the RF hardware architecture to support multiple applications and operating modes including the intended full FDD operation with a variety of antenna configurations. Moreover, flexibility is provided for an alternate TDD mode in either band (transmit passband, or receive passband).

Figure 5D:
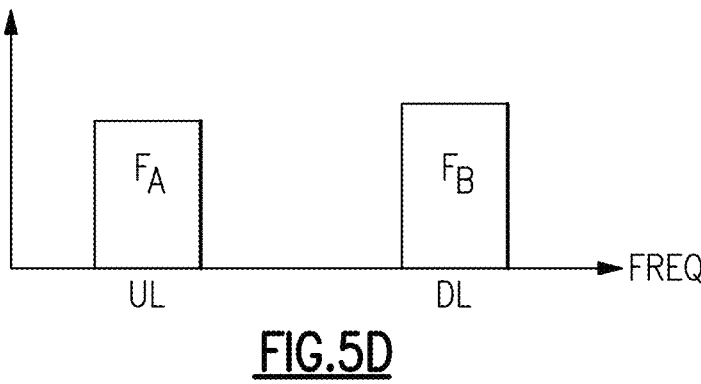
FIG. 5D is one example of a graph of a frequency band in FDD.

FIG. 5D is one example of a graph of a frequency band in FDD. In this example, the FDD frequency band includes an uplink frequency range $F_A$ and a downlink frequency range $F_B$. In this example, the uplink frequency range $F_A$ is lower than the downlink frequency range $F_B$.

Figure 5E:
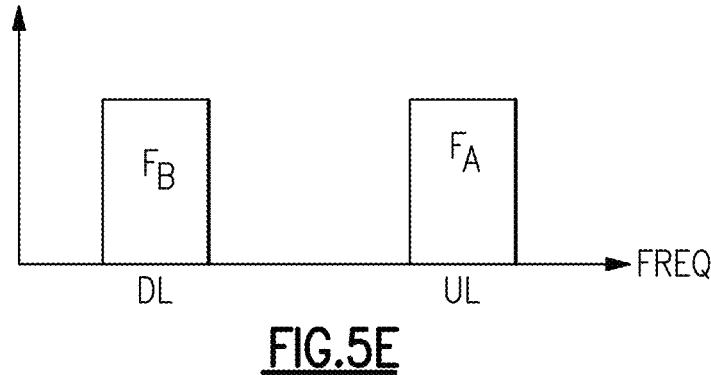
FIG. 5E is another example of a graph of a frequency band in FDD.

FIG. 5E is another example of a graph of a frequency band in FDD. The graph of FIG. 5E is similar to the graph of FIG. 5D, except that in the example of FIG. 5E the uplink frequency range $F_A$ is higher than the downlink frequency range $F_B$.

Figure 5F:
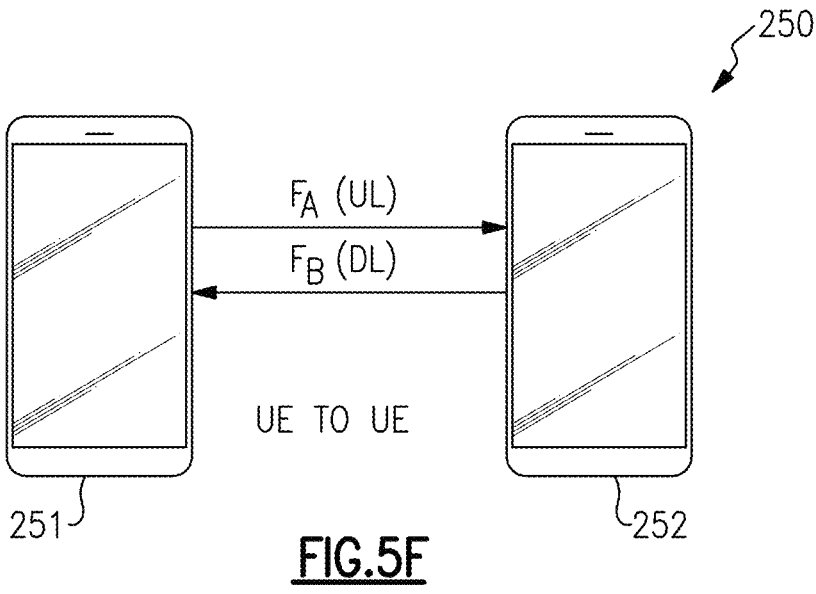
FIG. 5F is one embodiment of beamforming from UE to UE using FDD.

FIG. 5F is one embodiment of beamforming from UE to UE using FDD. The communication link 250 is between a first UE 251 and a second UE 252. The first UE 251 transmits on the uplink frequency range $F_A$ and receives on the downlink frequency range $F_B$. Thus, the first UE 251 behaves as a conventional UE in that it transmits on a designated uplink frequency and receives on a designated downlink frequency.

However, as shown in FIG. 5F, the second UE 252 receives on the uplink frequency range $F_A$ and transmits on the downlink frequency range $F_B$. Thus, the second UE 252 behaves as a gNodeB/base station, small cell/access point, and/or repeater. Such functionality is enabled by the teachings herein by included the crossbar switch 222 as shown in the embodiments of FIGS. 5C and 6B.

Figure 6A:
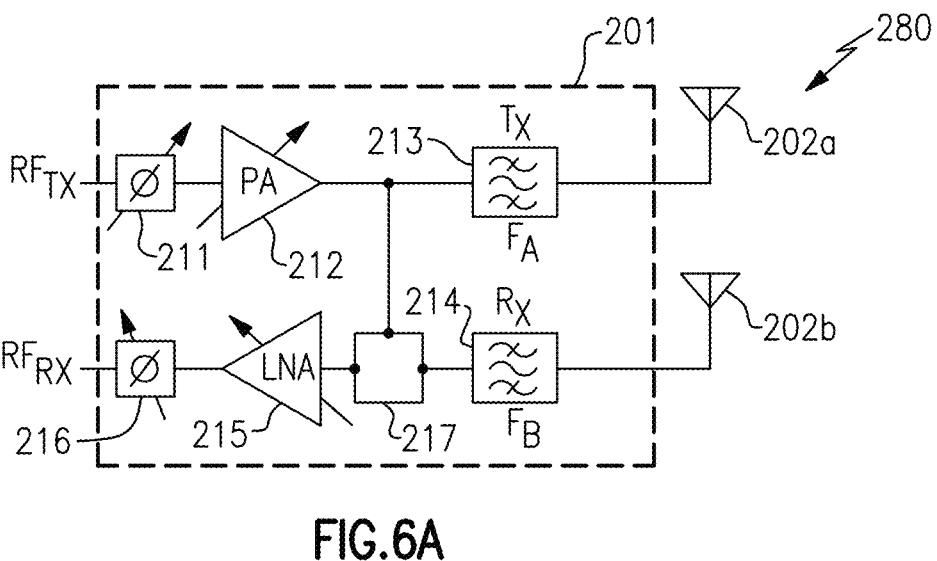
FIG. 6A is a schematic diagram of another embodiment of a beamforming signal channel using FDD.

FIG. 6A is a schematic diagram of another embodiment of a beamforming signal channel 280 using FDD. The beamforming signal channel 280 includes a signal conditioning circuit 201, a first antenna 202a, and a second antenna 202b.

The beamforming signal channel 280 of FIG. 6A is similar to the beamforming signal channel 210 of FIG. 5B, except that the beamforming signal channel 280 of FIG. 6A includes separate antennas for transmit and receive. For example, as shown in FIG. 6A, the first antenna 202a is connected to the transmit filter 213, while the second antenna 202b is connected to the receive filter 214.

Figure 6B:
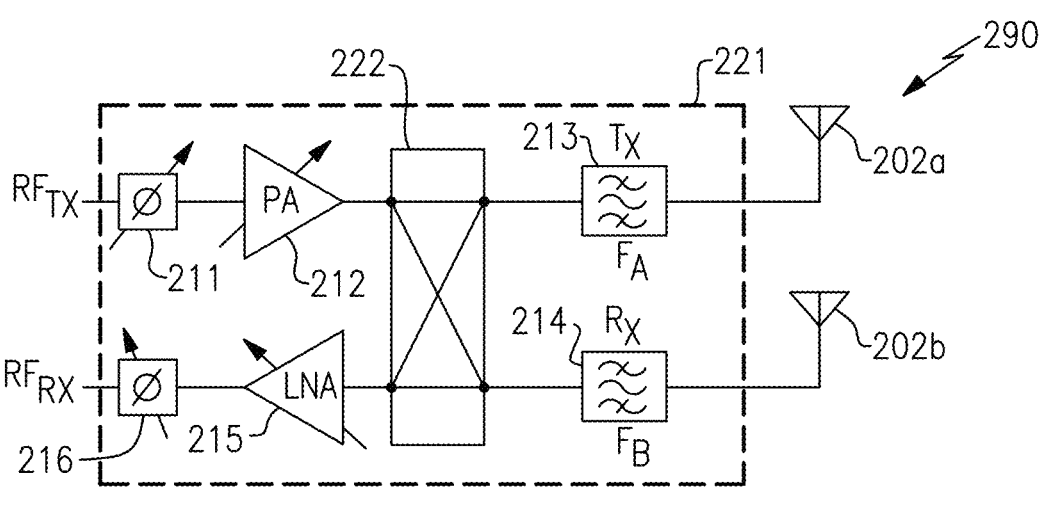
FIG. 6B is a schematic diagram of another embodiment of a beamforming signal channel using FDD.

FIG. 6B is a schematic diagram of another embodiment of a beamforming signal channel 290 using FDD. The beamforming signal channel 290 includes a signal conditioning circuit 221, a first antenna 202a, and a second antenna 202b.

The beamforming signal channel 290 of FIG. 6B is similar to the beamforming signal channel 230 of FIG. 5C, except that the beamforming channel 290 includes the first antenna 202a connected to the transmit filter 213 and the second antenna 202b connected to the receive filter 214.

Figure 7:
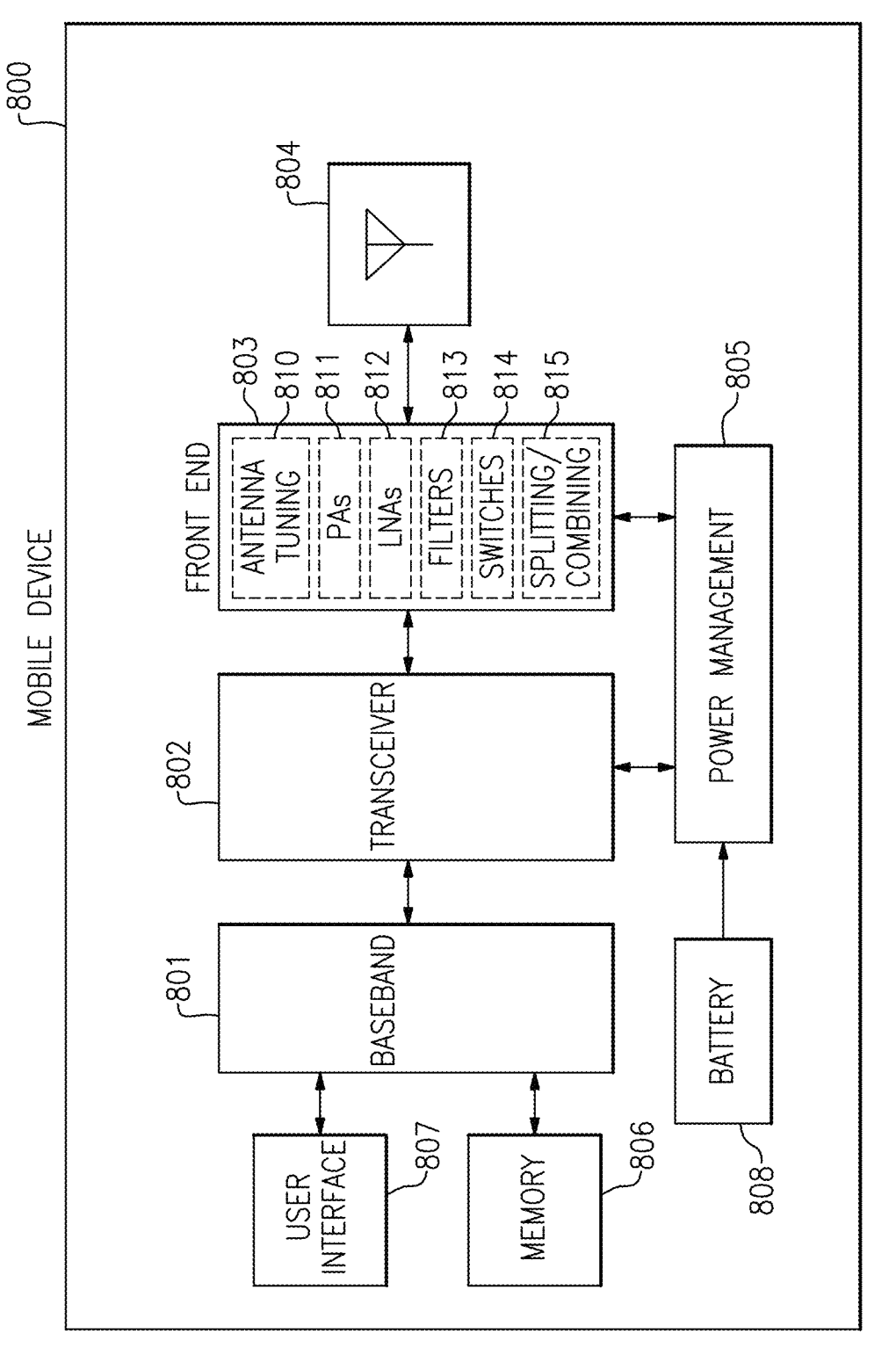
FIG. 7 is a schematic diagram of one embodiment of a mobile device.

FIG. 7 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 7 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 7, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 7, the power management system 805 receives a battery voltage from the battery 808. The battery 808 can be any suitable battery for use in the mobile device 800, including, for example, a lithium-ion battery.

Figure 8:
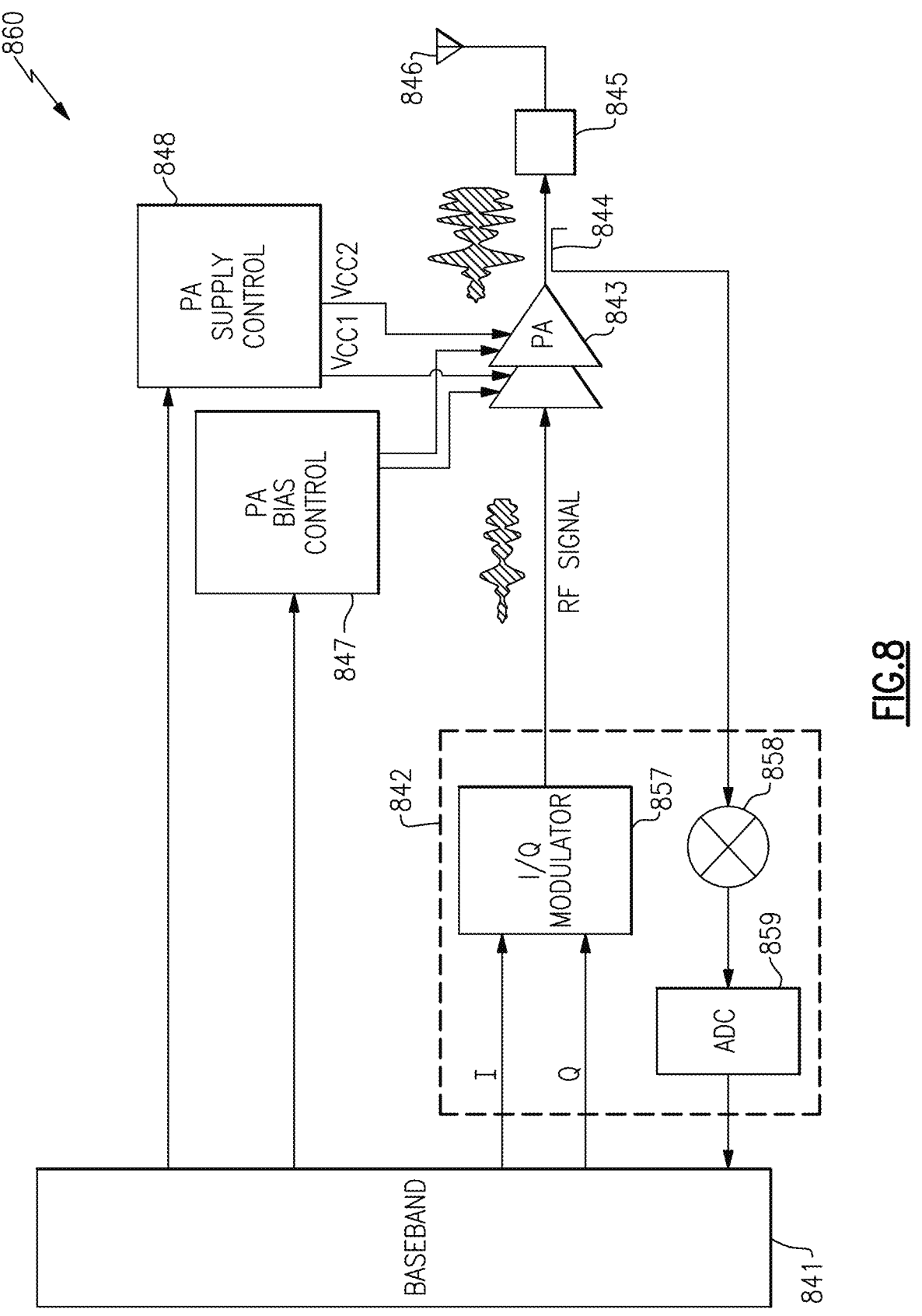
FIG. 8 is a schematic diagram of a power amplifier system according to one embodiment.

FIG. 8 is a schematic diagram of a power amplifier system 860 according to one embodiment. The illustrated power amplifier system 860 includes a baseband processor 841, a transmitter/observation receiver 842, a power amplifier (PA) 843, a directional coupler 844, front end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front end circuitry 845.

The front end circuitry 845 can be implemented in a wide variety of ways. In one example, the front end circuitry 845 includes one or more switches, filters, duplexers, multiplexers, and/or other components. In another example, the front end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 8, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Applications

Some of the embodiments described above have provided examples in connection with mobile phones. However, the principles and advantages of the embodiments can be used for any other systems or apparatus that have needs for beamforming in FDD. Examples of such RF communication systems include, but are not limited to, tablets, base stations, network access points, customer-premises equipment (CPE), laptops, and wearable electronics.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front end system for a mobile phone, the front end system comprising:

a first transmit path configured to process a first radio frequency transmit signal of a frequency band, the transmit path including a power amplifier configured to amplify the first radio frequency transmit signal to generate a first amplified radio frequency transmit signal and a transmit filter having a passband that passes an uplink frequency range of the frequency band; and a receive path configured to process a first radio frequency receive signal of the frequency band, the receive path including a low noise amplifier, a switch, and a receive filter having a passband that passes a downlink frequency range of the frequency band, the switch having a first state in which an input of the low noise amplifier is coupled to the receive filter and a second state in which an output of the power amplifier is coupled to the receive filter, the receive filter providing the first amplified radio frequency transmit signal from the power amplifier to an antenna in the second state of the switch, the front end system operable in a frequency division duplexing mode in which the front end system simultaneously sends a transmit beam on the uplink frequency range of the frequency band and receives a receive beam on a downlink frequency range of the frequency band.

2. The front end system of claim 1 further configured to set the switch in the second state to transmit the first amplified radio frequency transmit signal on the downlink frequency range to aid in acquiring the receive beam as part of beamforming the receive beam on the downlink frequency range in the frequency division duplexing mode.

3. The front end system of claim 1 wherein the switch is a crossbar switch operable to couple the input of the low noise amplifier to the transmit filter in the second state.

4. The front end system of claim 1 wherein the front end system is further operable in a first time division duplexing mode in which the transmit beam and the receive beam are sent on a first common frequency using time division duplexing, and a second time division duplexing mode in which the transmit beam and the receive beam are sent on a second common frequency using time division duplexing.

5. The front end system of claim 4 wherein the first common frequency for time division duplexing is the uplink frequency range and the second common frequency is the downlink frequency range.

6. The front end system of claim 1 further comprising a common antenna port connecting the transmit filter and the receive filter to the antenna.

7. The front end system of claim 1 further comprising a first antenna port connected to the transmit filter and a second antenna port connected to the receive filter and the antenna.

8. The front end system of claim 1 further comprising a transmit-path phase shifter along the transmit path and a receive-path phase shifter along the receive path.

9. A mobile device comprising:

an antenna;

a transceiver configured to generate a plurality of radio frequency transmit signals including a first radio frequency transmit signal, and to receive a plurality of radio frequency receive signals including a first radio frequency receive signal; and a front end system coupled to the transceiver and configured to provide beamforming in a frequency band using frequency division duplexing, the front end system including a first signal conditioning circuit including a transmit path configured to process the first radio frequency transmit signal and a receive path configured to process the first radio frequency receive signal, the receive path including a low noise amplifier, a switch, and a receive filter having a passband that passes a downlink frequency range of the frequency band, the transmit path including a power amplifier configured to amplify the first radio frequency transmit signal to generate a first amplified radio frequency transmit signal and a transmit filter having a passband that passes an uplink frequency range of the frequency band, the switch having a first state in which an input of the low noise amplifier is coupled to the receive filter and a second state in which an output of the power amplifier is coupled to the receive filter, the receive filter providing the first amplified radio frequency transmit signal from the power amplifier to the antenna in the second state of the switch, the front end system operable in a frequency division duplexing mode in which the front end system simultaneously sends a transmit beam on the uplink frequency range of the frequency band and receives a receive beam on a downlink frequency range of the frequency band.

10. The mobile device of claim 9 wherein the transceiver is configured to set the switch in the second state to transmit the first amplified radio frequency transmit signal on the downlink frequency range to aid in acquiring the receive beam as part of beamforming the receive beam on the downlink frequency range in the frequency division duplexing mode.

11. The mobile device of claim 9 wherein in the second state the power amplifier and the receive filter operate to transmit the first radio frequency transmit signal over the downlink frequency range.

12. The mobile device of claim 11 in communication with a base station that calibrates the receive beam based on the transmission of the first radio frequency transmit signal over the downlink frequency range.

13. The mobile device of claim 9 wherein the switch is a crossbar switch operable to couple the input of the low noise amplifier to the transmit filter in the second state.

14. The mobile device of claim 9 wherein the front end system is further operable in a first time division duplexing mode in which the transmit beam and the receive beam are sent on a first common frequency using time division duplexing, and and a second time division duplexing mode in which the transmit beam and the receive beam are sent on a second common frequency using time division duplexing.

15. The mobile device of claim 14 wherein the first common frequency for time division duplexing is the uplink frequency range and the second common frequency for time division duplexing is the downlink frequency range.

16. The mobile device of claim 9 wherein the transceiver is configured to control the front end system to emulate the mobile phone as a base station communicating using frequency division duplexing in the frequency band.

17. The mobile device of claim 9 wherein the transceiver is operable to control a gain setting and a phase setting for each of the transmit path and the receive path to control beamforming.

18. A method of beamforming in a mobile phone, the method comprising:

forming a transmit beam, including processing a first radio frequency transmit signal of a frequency band using a transmit path through a first signal conditioning channel of a front end system, the transmit path including a power amplifier that amplifies the first radio frequency transmit signal to generate a first amplified radio frequency transmit signal and a transmit filter having a passband that passes an uplink frequency range of the frequency band;

forming a receive beam, including processing a first radio frequency receive signal of the frequency band using a receive path through a second signal conditioning channel of the front end system, the receive path including a low noise amplifier, a switch, and a receive filter having a passband that passes a downlink frequency range of the frequency band;

setting the switch in a first state in which an input of the low noise amplifier is coupled to the receive filter;

setting the switch in a second state in which an output of the power amplifier is coupled to the receive filter, the receive filter providing the first amplified radio frequency transmit signal from the power amplifier to an antenna in the second state of the switch; and operating the front end system in a frequency division duplexing mode in which the front end system simultaneously sends the transmit beam on the uplink frequency range of the frequency band and receives the receive beam on a downlink frequency range of the frequency band.

19. The method of claim 18 further comprising setting the switch in the second state to transmit the first amplified radio frequency transmit signal on the downlink frequency range to aid in acquiring the receive beam as part of beamforming the receive beam on the downlink frequency range in the frequency division duplexing mode.

20. The method of claim 18 further comprising operating the front end system in a first time division duplexing mode in which the transmit beam and the receive beam are sent on a first common frequency using time division duplexing, and operating the front end system in a second time division duplexing mode in which the transmit beam and the receive beam are sent on a second common frequency using time division duplexing.

* * * * *